(12) United States Patent
Sharma et al.

(10) Patent No.: US 11,796,829 B1
(45) Date of Patent: Oct. 24, 2023

(54) IN-FIELD ILLUMINATOR FOR EYE DEPTH SENSING

(71) Applicant: Meta Platforms Technologies, LLC, Menlo Park, CA (US)

(72) Inventors: Robin Sharma, Redmond, WA (US); Karol Constantine Hatzilias, Kenmore, WA (US); Christopher Yuan-Ting Liao, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 411 days.

(21) Appl. No.: 16/918,674

(22) Filed: Jul. 1, 2020

Related U.S. Application Data

(60) Provisional application No. 62/928,980, filed on Oct. 31, 2019.

(51) Int. Cl.
G02B 27/42 (2006.01)
G02B 27/01 (2006.01)
G02B 27/00 (2006.01)
G02B 27/10 (2006.01)

(52) U.S. Cl.
CPC ..... G02B 27/4205 (2013.01); G02B 27/0093 (2013.01); G02B 27/0172 (2013.01); G02B 27/1006 (2013.01); G02B 2027/0138 (2013.01); G02B 2027/0174 (2013.01); G02B 2027/0178 (2013.01)

(58) Field of Classification Search
CPC ............ G02B 27/4205; G02B 27/0093; G02B 27/0172; G02B 27/1006; G02B 2027/0138; G02B 2027/0174; G02B 2027/0178
USPC ......................................................... 359/350
See application file for complete search history.

(56) References Cited

U.S. PATENT DOCUMENTS

| | | | |
|---|---|---|---|
| 10,345,589 B1 * | 7/2019 | Son .......................... | G02B 5/30 |
| 10,571,709 B2 * | 2/2020 | Mor .................... | G01B 11/2513 |
| 2015/0103404 A1 * | 4/2015 | Rudy .................. | G02B 27/0172 372/45.01 |
| 2018/0218210 A1 * | 8/2018 | Georgiou ........... | G01B 11/2527 |
| 2019/0258062 A1 * | 8/2019 | Aleem ............... | G02B 27/0172 |
| 2020/0074651 A1 | 3/2020 | Zhang et al. | |

FOREIGN PATENT DOCUMENTS

WO    WO-2019104413 A1 *    6/2019    ............. A61B 3/113

* cited by examiner

*Primary Examiner* — Collin X Beatty
(74) *Attorney, Agent, or Firm* — FREESTONE INTELLECTUAL PROPERTY LAW PLLC; Aaron J. Visbeek

(57) ABSTRACT

A near-eye optical device includes a transparent layer, an in-field illuminator, and a diffractive optical element (DOE). The in-field illuminator is configured to emit near-infrared light centered around a first wavelength. The diffractive optical element is configured to be illuminated by the near-infrared light emitted by the in-field illuminator. The DOE generates a structured light projection that includes dots that expand as the structured light projection propagates farther from the DOE. The structured light projection is directed to illuminate an eyebox.

17 Claims, 10 Drawing Sheets

US 11,796,829 B1

IN-FIELD ILLUMINATOR FOR EYE DEPTH SENSING

CROSS REFERENCE TO RELATED APPLICATIONS

This application claims priority to U.S. provisional Application No. 62/928,980 filed Oct. 31, 2019, which is hereby incorporated by reference.

BACKGROUND INFORMATION

A variety of techniques for range and depth sensing have been developed by different industries. For example, one stereo triangulation technique includes imaging an object with two different cameras and determining a distance to the object using corresponding points in the images from the two cameras. Time of Flight (TOF) is another existing technique that may include transmitting laser pulses and measuring the time of flight between the transmitted and reflected laser pulse to calculate the depth of an object that reflected the laser pulse. However, these techniques are limited by the context they are deployed in. TOF techniques, for example, struggle in very near-range contexts because resolving the short time of flight of the pulses is difficult.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
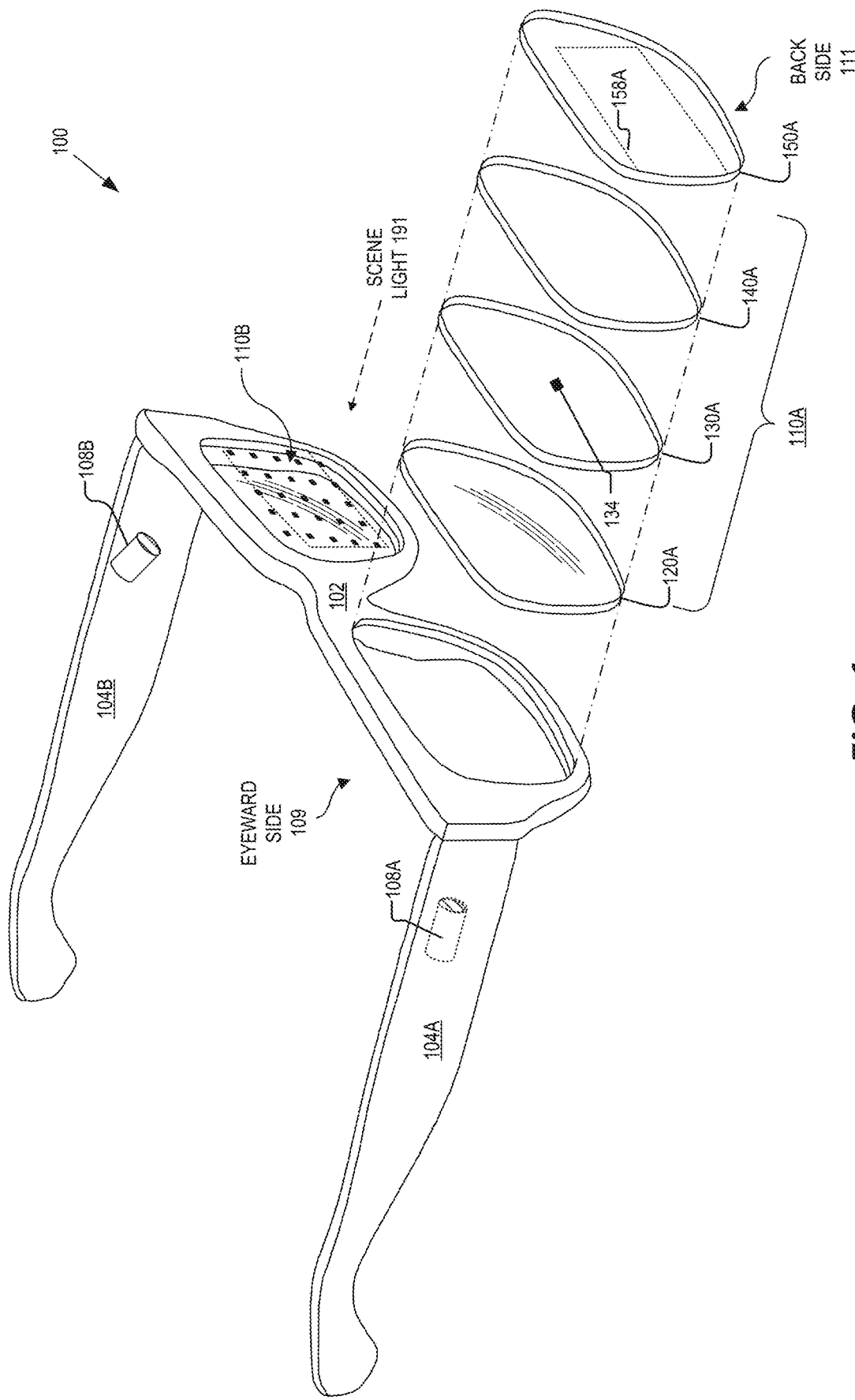
FIG. 1 illustrates an example HMD, in accordance with aspects of the disclosure.

Embodiments of depth sensing systems and devices are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of depth sensing systems and devices described in the disclosure may facilitate high resolution near-range depth sensing. The near-range depth sensing embodiments may be specifically implemented in a head mounted display (HMD) for determining a three-dimensional depth mapping of an eye of a wearer of an HMD and the three-dimensional depth mapping may be used for eye-tracking or other purposes.

Prior depth sensing techniques include Time of Flight and patterned projections. Time of Flight (ToF) techniques include transmitting laser pulses and measuring the time of flight between the transmitted and reflected laser pulse to calculate the depth of an object that reflected the laser pulse. However, ToF systems struggle in very near-range contexts because resolving the short time of flight of the pulses (propagating at the speed of light) is difficult.

In embodiments of the disclosure, one or more in-field illuminators such as a near-infrared vertical-cavity surface-emitting laser (VCSEL) illuminate a diffractive optical element (DOE) that generates a structured light projection for illuminating an eye of a user. The structured light projection may include dots that expand as the light propagates farther from the DOE. The in-field illuminators are positioned on a near-eye optical element that is in the field of view (FOV) of a user. However, the in-field illuminators and DOE are small enough and/or positioned close enough to the eye of the user as to be unnoticeable by the user. A light source that is not an in-field illuminator may illuminate the DOE to generate a structured light projection for illuminating the eye, in some embodiments. A camera may be positioned to image the structured light projection that is projected onto an eyebox area. In some embodiments, an optical combiner included in the near-eye optical element is configured to receive a reflection of the structured light projection (reflected off the eye area of the user) and redirect the reflection of the structured light projection to the camera for imaging. Based on the image(s) of the structured light projection on the eye, a three-dimensional depth mapping of the eye may be determined. In some implementations, the three-dimensional depth mapping of the eye may be used for eye-tracking.

In an embodiment of the disclosure, a near-eye optical device includes an in-field illuminator that illuminates a first beam expanding element in a FOV of a user and a second beam expanding element in the FOV of a user. The first beam expanding element is configured to direct a first expanding beam to the eyebox area and the second beam expanding element is configured to direct a second expanding beam to the eyebox area. The first expanding beam and the second expanding beam overlap to generate a fringe interference pattern within the eyebox area. A camera may capture images of the fringe interference pattern to generate a three-dimensional depth mapping of the eye. In some embodiments, an optical combiner included in the near-eye optical element is configured to receive a reflection of the fringe interference pattern (reflected off the eye area of the user) and redirect the reflection of the fringe interference pattern to the camera for imaging.

Embodiments of the disclosure may be particularly useful in near-range depth sensing context where ToF systems struggle to generate accurate mappings. The embodiments of the disclosure may have the advantage of being placed within a field of view of an eye of a wearer of an HMD such that the user still has a clear view of incoming scene light. These and other embodiments are described in detail with respect to FIGS. 1-8 below FIG. 1 illustrates an example HMD 100, in accordance with aspects of the present disclosure. The illustrated example of HMD 100 is shown as including a frame 102, temple arms 104A and 104B, and near-eye optical elements 110A and 110B. Eye-tracking cameras 108A and 108B are shown as coupled to temple arms 104A and 104B, respectively. Cameras 108A and 108B may be mounted in alternative positions in different embodiments. FIG. 1 also illustrates an exploded view of an example of near-eye optical element 110A. Near-eye optical element 110A is shown as including an optional lens layer 120A, a transparent layer 130A, an optical combiner layer 140A, and a display layer 150A. Transparent layer 130A is shown as including an in-field illuminator 134. In some embodiments, a plurality of in-field illuminators 134 are included in transparent layer 130. The in-field illuminator(s) 134 may be configured to emit near-infrared illumination light for depth sensing purposes, for example. Display layer 150A may include a waveguide 158 that is configured to direct virtual images to an eye of a user of HMD 100.

As shown in FIG. 1, frame 102 is coupled to temple arms 104A and 104B for securing the HMD 100 to the head of a user. Example HMD 100 may also include supporting hardware incorporated into the frame 102 and/or temple arms 104A and 104B. The hardware of HMD 100 may include any of processing logic, wired and/or wireless data interface for sending and receiving data, graphic processors, and one or more memories for storing data and computer-executable instructions. In one example, HMD 100 may be configured to receive wired power and/or may be configured to be powered by one or more batteries. In addition, HMD 100 may be configured to receive wired and/or wireless data including video data.

FIG. 1 illustrates near-eye optical elements 110A and 110B that are configured to be mounted to the frame 102. In some examples, near-eye optical elements 110A and 110B may appear transparent to the user to facilitate augmented reality or mixed reality such that the user can view visible scene light from the environment while also receiving display light directed to their eye(s) by way of display layer 150A. In further examples, some or all of near-eye optical elements 110A and 110B may be incorporated into a virtual reality headset where the transparent nature of the near-eye optical elements 110A and 110B allows the user to view an electronic display (e.g., a liquid crystal display (LCD), an organic light emitting diode (OLED) display, a micro-LED display, etc.) incorporated in the virtual reality headset. A "near-eye optical device" may be defined as including an optical element that is configured to be placed within 25 mm of an eye of a user while the near-eye optical device is being utilized.

As shown in FIG. 1, transparent layer 130A includes an in-field illuminator 134. More than one in-field illuminators 134 may be included in transparent layer 130A in some embodiments. Each in-field illuminator 134 may be disposed on, or encapsulated by, a transparent substrate and may be configured to emit light towards an eyeward side 109 of the near-eye optical element 110A. In some aspects of the disclosure, the in-field illuminator(s) 134 are configured to emit near-infrared light (e.g. 700 nm-1.4 μm). Each in-field illuminator 134 may be a micro light emitting diode (micro-LED), an edge emitting LED, a vertical cavity surface emitting laser (VCSEL) diode, or a Superluminescent diode (SLED).

Conventional eye illumination solutions may provide light sources disposed around a rim/periphery of a lens. However, placing light sources within the field of view of the eye may be advantageous for illuminating the eye more directly and therefore capturing improved images of the eye for depth sensing and/or eye-tracking. While in-field illuminator(s) 134 may introduce minor occlusions into the near-eye optical element 110A, the in-field illuminator(s) 134, as well as corresponding electrical routing may be so small as to be unnoticeable or insignificant to a wearer of HMD 100. Additionally, any occlusion from in-field illuminator(s) 134 will be placed so close to the eye as to be unfocusable by the human eye and therefore assist in the in-field illuminators 134 being not noticeable or insignificant. In some embodiments, in-field illuminator 134 has a footprint (or size) that is less than about 200×200 microns. The electrical traces that provide power to the in-field illuminators may be transparent or partially transparent. In some embodiments, indium tin oxide (ITO) is used as a transparent electrical conductor for trace routing to the in-field illuminators 134.

As mentioned above, the in-field illuminators 134 of the transparent layer 130A may be configured to emit infrared illumination light towards the eyeward side 109 of the near-eye optical element 110A to illuminate the eye of a user. The near-eye optical element 110A is shown as including optical combiner layer 140A where the optical combiner layer 140A is disposed between the transparent layer 130A and a backside 111 of the near-eye optical element 110A. In some aspects, the optical combiner 140A is configured to receive reflected infrared light that is reflected by the eye of the user and to direct the reflected infrared light towards the eye-tracking camera 108A. In some examples, the eye-tracking camera 108A is an infrared camera configured to image the eye of the user based on the received reflected infrared light.

In some aspects, the optical combiner 140A is transmissive to visible light, such as scene light 191 incident on the backside 111 of the near-eye optical element 110A. In some examples, the optical combiner 140A may be configured as a volume hologram and/or may include one or more Bragg gratings for directing the reflected infrared light towards the eye-tracking camera 108A. In some examples, the optical combiner includes a polarization-selective hologram (a.k.a. polarized volume hologram) that diffracts a particular polarization orientation of incident light while passing other polarization orientations. In some embodiments, the optical combiner includes a Fresnel lens that includes "hot mirrors" disposed over Fresnel features of the Fresnel lens. The term "hot mirror" may refer to an optical coating that reflects a particular wavelength of infrared light while passing visible light.

Display layer 150A may include one or more optical elements depending on the design of the HMD 100. For example, the display layer 150A may include a waveguide 158 to direct display light generated by an electronic display to the eye of the user. In some implementations, at least a portion of the electronic display is included in the frame 102 of the HMD 100. The electronic display may include an LCD, an organic light emitting diode (OLED) display, micro-LED display, pico-projector, or liquid crystal on silicon (LCOS) display for generating the display light.

Optional lens layer 120A is shown as being disposed between the transparent layer 130A and the eyeward side 109 of the near-eye optical element 110A. The optional lens layer 120A may receive the infrared light emitted by the transparent layer 130A and pass the infrared light to illuminate the eye of the user. As mentioned above, the optional lens layer 120A may also be transparent to visible light, such as scene light 191 received from the environment and/or display light received from the display layer 150A. In some examples, the optional lens layer 120A has a curvature for focusing light (e.g., display light and/or scene light) to the eye of the user. Thus, the optional lens layer 120A may, in some examples, be referred to as a lens. In some aspects, the optional lens layer 120A has a thickness and/or curvature that corresponds to the specifications of a user. In other words, the optional lens layer 120A may be a prescription lens. However, in other examples, the optional lens layer 120A may be a non-prescription lens.

Figure 2:
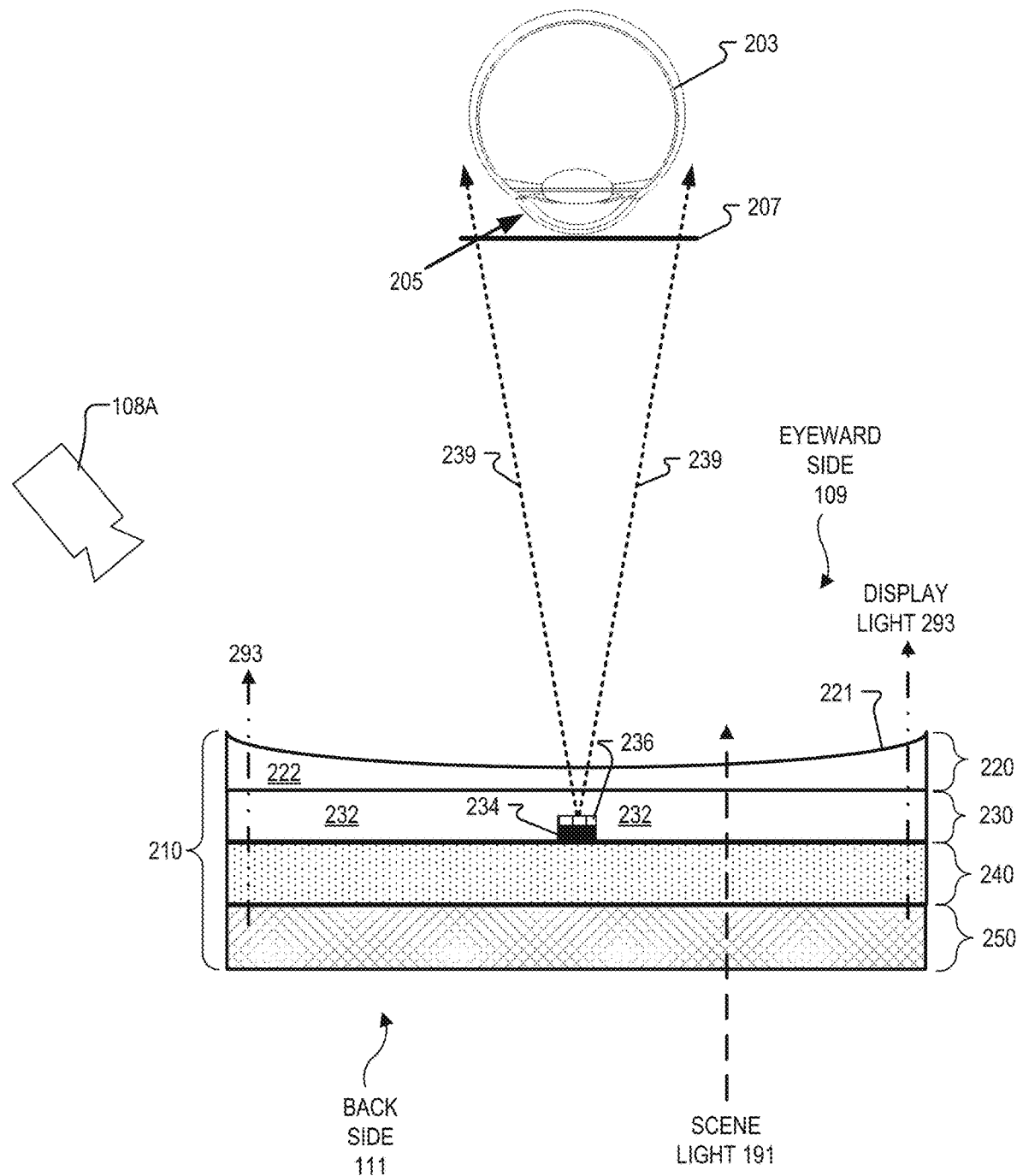
FIG. 2 is a top view of an example near-eye optical element that includes an optional lens layer, a transparent layer, a combiner layer, and a display layer, in accordance with aspects of the disclosure.

FIG. 2 is a top view of an example near-eye optical element 210 that includes an optional lens layer 220, a transparent layer 230, a combiner layer 240, and a display layer 250, in accordance with aspects of the disclosure. Optional lens layer 220 may include a transparent refractive material 222. In-field illuminator 234 is coupled with transparent layer 230 in a field of view (FOV) of a user when a user is utilizing near-eye optical element 210. In-field illuminator 234 is configured to emit near-infrared light centered around a first infrared wavelength. In one example in-field illuminator 234 includes a VCSEL emitting near-infrared light centered around 850 nm. The near-infrared light may have a very narrow linewidth. Transparent layer 230 may include a transparent material 232 that may encapsulate the in-field illuminator 234. Transparent material 232 and refractive material 222 are configured to transmit visible light (e.g. 400 nm-700 nm) and near-infrared light (e.g. 700 nm-1.4 μm). As described above, in-field illuminator 234 may be a VCSEL or SLED and consequently the emitted near-infrared light may be narrow-band infrared illumination light (e.g. linewidth of 0.5-10 nm).

Figure 4:
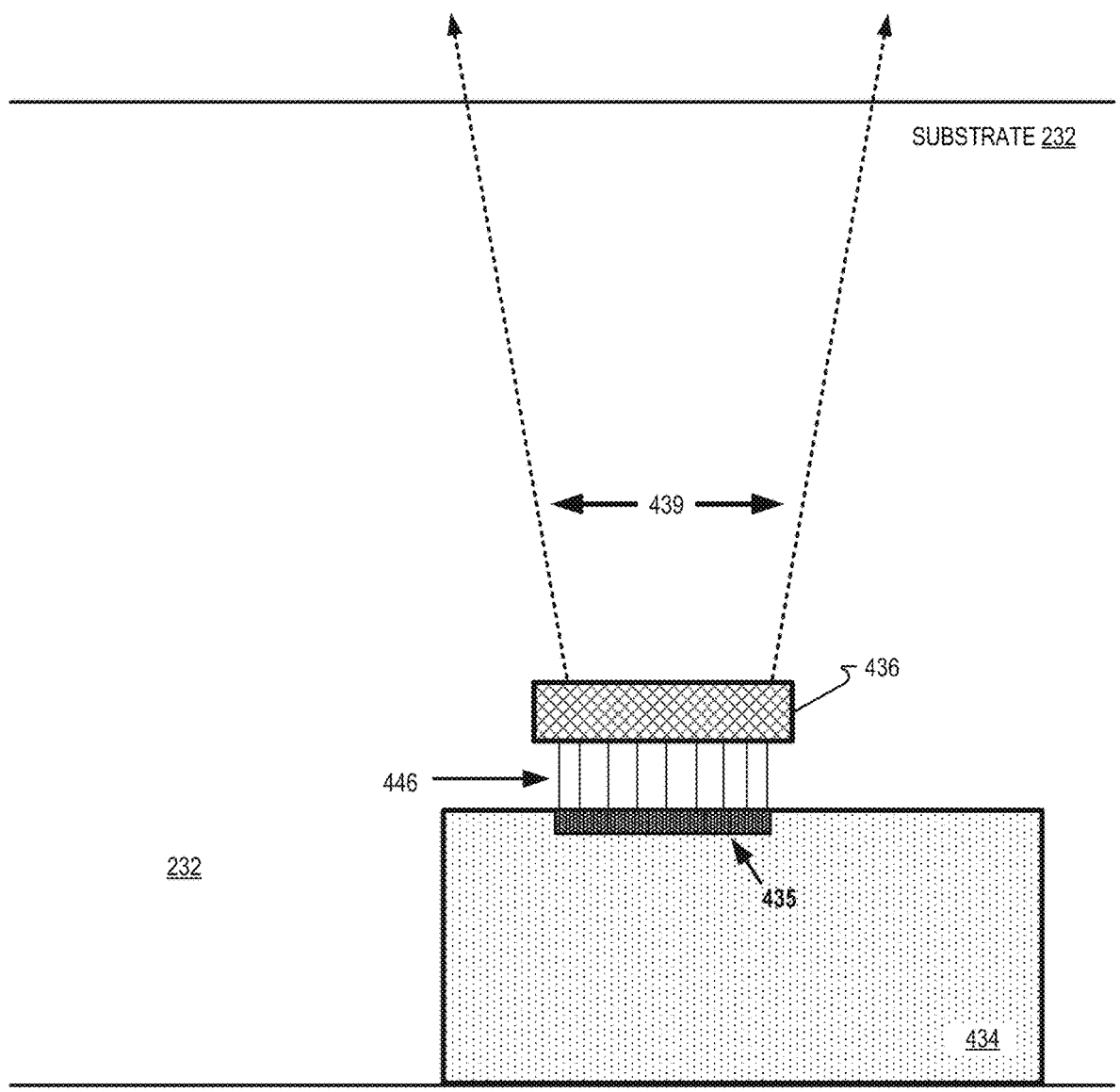
FIG. 4 illustrates an example in-field illuminator emitting near-infrared light from an exit aperture that illuminates a diffractive optical element (DOE), in accordance with aspects of the disclosure.

In FIG. 2, the near-infrared light emitted by the in-field illuminator illuminates diffractive optical element 236 to generate structured light projection 239. FIG. 4 illustrates an example in-field illuminator 434 emitting near-infrared light 446 from an exit aperture 435 that illuminates a diffractive optical element (DOE) 436 that is disposed to be illuminated by the near-infrared light 446 emitted by the in-field illuminator 434. Near-infrared light 446 may be collimated where in-field illuminator 434 is configured to emit collimated near-infrared light. When DOE 436 is illuminated by the near-infrared light 446 centered around a given wavelength, DOE 436 generates a structured light projection 439 that includes dots that expand as the structured light projection 439 propagates farther from DOE 436. The structured light projection 439 is directed to an eyebox area (e.g. eyebox area 207) by DOE 436 to illuminate an eye of a user with the structured light projection 439. In the illustrated embodiment, DOE 436 is a transmissive DOE. In an embodiment, DOE 436 is configured as a reflective DOE that is illuminated by in-field illuminator 434 and reflects structured light projection 439. DOE 436 may be fabricated using recording techniques consistent with fabricating a hologram.

Figure 3:
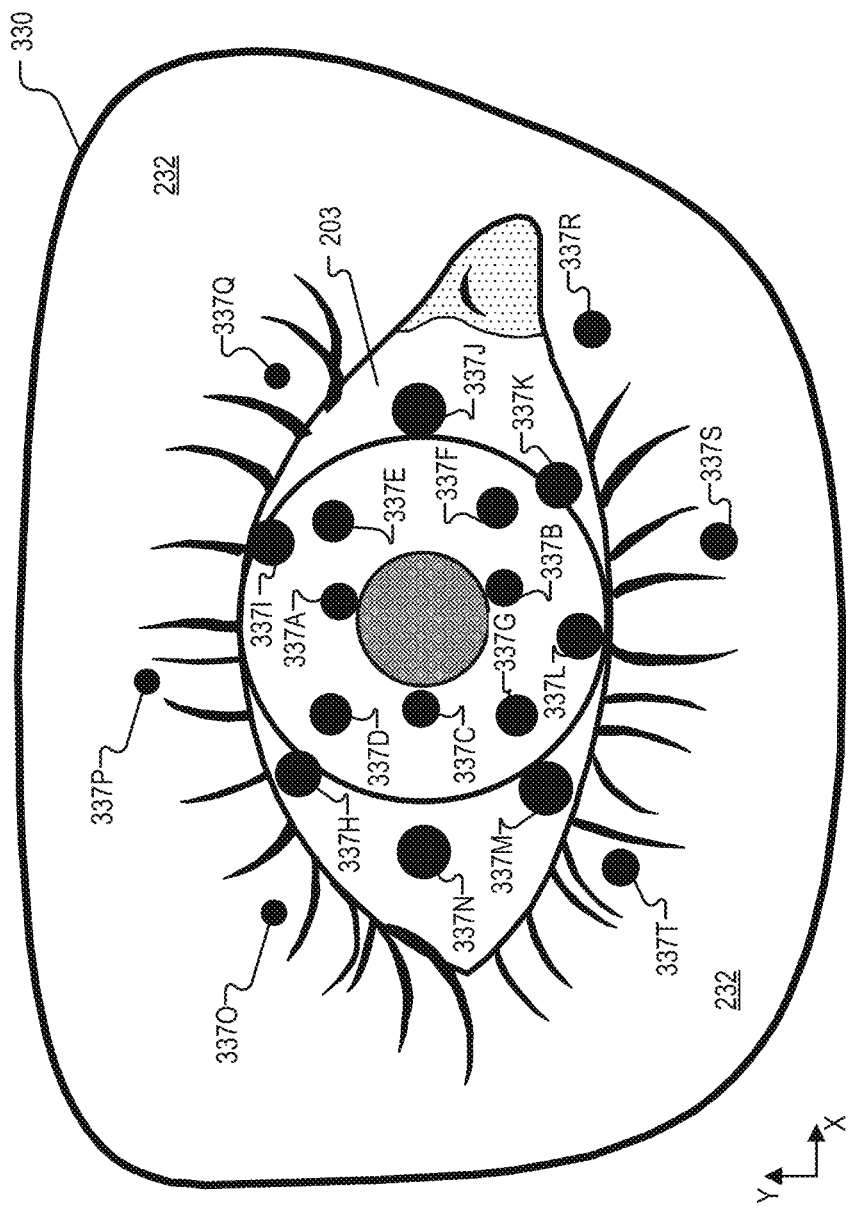
FIG. 3 illustrates an eye illuminated by dots of a structured light projection, in accordance with aspects of the disclosure.

FIG. 3 illustrates an eye 203 illuminated by dots 337 of an example structured light projection 239/439, in accordance with aspects of the disclosure. Eye 203 is illustrated as viewed through an example transparent layer 330 of a near-eye optical element. FIG. 3 illustrates dots 337A-337T included in a structured light projection 239/439. In the illustrated embodiment, dots 337 are circular although dots 337 may be different geometric shapes. Those skilled in the art appreciate that dots 337 are illustrated for illustration purposes and that in some implementations, hundreds or even thousands of dots 337 may be projected into the eyebox area for a higher resolution depth mapping of the eye 203.

The farther that dots 337 propagate from DOE 236/436, the larger the dots become. Therefore, the depth z that a portion of the eye is from DOE 236 will correspond to the size of a dot 337. By way of example, dots 337A, 337B, 337C are smaller than dots 337D, 337E, 337F, and 337G because the portion of the eye closer to the pupil is closer to DOE 236/436, in the illustrated example. Similarly, dots 337H, 337I, 337K, and 337L are larger than dots 337D, 337E, 337F, and 337G. For the same reason, dots 337M, 337N, and 337J are larger than dots 337H, 337I, 337K, and 337L. Noticeably, dots 337O, 337P, and 337Q are projected on an eye lid or brow area that may be closer to DOE 236/436 than dot 337A and hence dots 337O, 337P, and 337Q are smaller than dot 337A. Dots 337R, 337S, and 337T may also be smaller than dot 337N, for example, if skin under the eye is closer to DOE 236/436 than the sclera portion that dot 337N illuminates.

Instead of an in-field illuminator 234, in some embodiments (not illustrated) one or more light sources that is not necessarily in the FOV of the user illuminates a DOE to generate a structured light projection similar to structured light projection 239/439. In this embodiment, an infrared light source located at the edge of a frame of an HMD may provide infrared light to a transparent waveguide that delivers the infrared light to illuminate a DOE to generate a structured light projection. The infrared light source may be a VCSEL.

Figure 5:
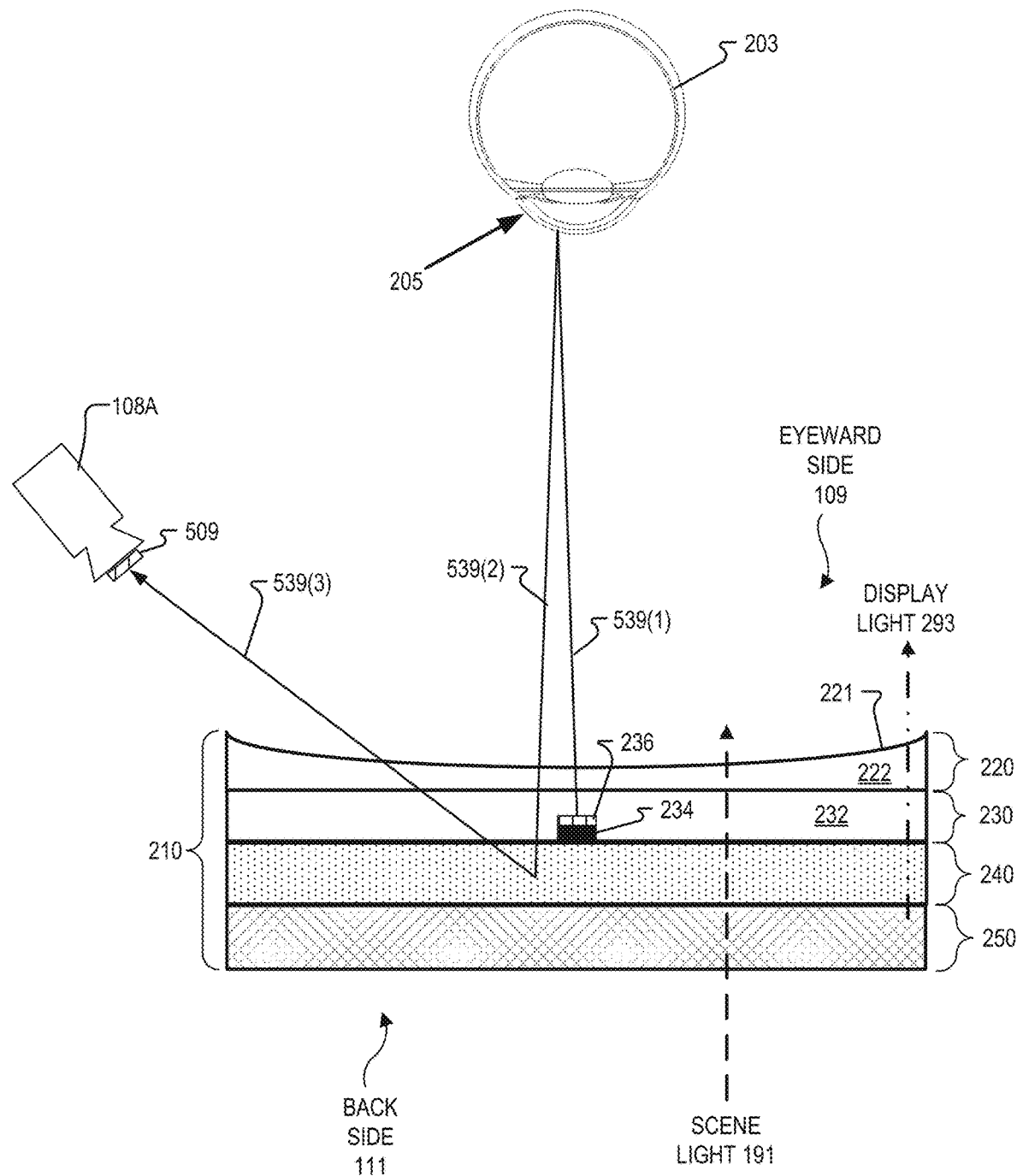
FIG. 5 illustrates a combiner layer configured to receive a reflection of a structured light projection that is reflected off an eye and redirect the reflection of the structured light projection to a camera, in accordance with aspects of the disclosure.

FIG. 5 illustrates a combiner layer 240 configured to receive a reflection of a structured light projection that is reflected off eye 203 and redirect the reflection of the structured light projection to a camera 108A, in accordance with an aspect of the disclosure. In FIG. 5, in-field illuminator 234 illuminates DOE 236 to generate a structured light projection propagating along optical path 539(1). The reflection of the structured light projection is reflected from eye 203 and the eye lid, brow, and/or skin around the eye along optical path 539(2). The reflection of the structured light projection propagates through layers 220 and 230 before encountering combiner layer 240. An optical combiner in combiner layer 240 redirects the reflection to camera 108A, in FIG. 5.

In the illustrated embodiment, camera 108A is configured to image the structured light projection by receiving the reflection of the structured light projection from combiner layer 240. In other embodiments, a camera is configured to directly image the eyebox area to capture images of the structured light projection on the eye and the combiner layer 240 may be removed. An optical combiner in combiner layer 240 is configured to be optically transparent to visible light so that scene light 191 and display light 293 can propagate through combiner layer 240, transparent layer 230, and optional lens layer 220 to become incident on eye 203 so that a user can view the scene of an external environment. Yet, combiner layer 240 may be particularly configured to redirect the particular wavelength of near-infrared light that is emitted by in-field illuminator 234 to camera 108A, even while generally passing visible light.

Filter 509 is disposed in front of camera 108A in the illustrated embodiment and filter 509 may be configured to pass the particular wavelength of near-infrared light emitted by in-field illuminator 234 and reject other wavelengths of light. Camera 108A may include a complementary metal-oxide semiconductor (CMOS) image sensor. The reflections of the structured light projection(s) captured by camera 108A may be used for eye-tracking or other purposes. In some examples, the images captured by camera 108 of dots 337 are analyzed to determine the size of the dots 337 with respect to the position of the eye. The size of the dots is translated into a depth for a particular portion of the eye. Thus, by analyzing the size of dots 337 for many locations of the eye, a three-dimensional depth mapping of an eye can be generated. In some embodiments, a shape-signature of cornea 205 of eye 203 is determined by analyzing the dots 337. Determining the position of cornea 205 by its shape-signature may assist in determining which direction eye 203 is gazing for eye-tracking purposes, for example.

Figure 6A:
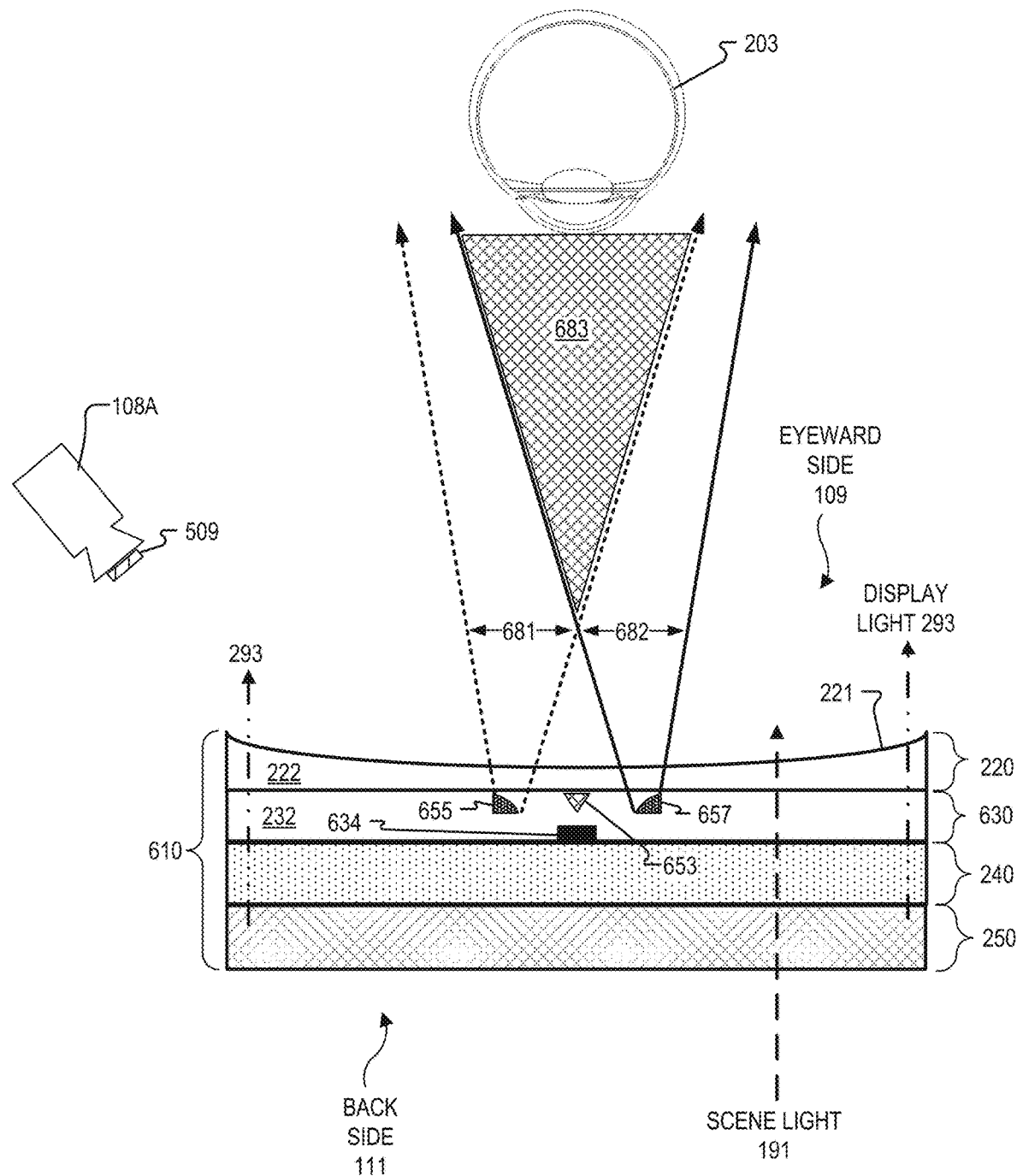
FIG. 6A illustrates a beam splitting element configured to redirect a first portion of a coherent near-infrared light emitted by an in-field illuminator to a first beam expanding element and redirect a second portion of the coherent near-infrared light to illuminate the second beam expanding element, in accordance with aspects of the disclosure.

FIG. 6A illustrates a top view of an example near-eye optical element 610 that includes a transparent layer 630 including an in-field illuminator 634 and two beam expanding elements in the FOV of a user, in accordance with an aspect of the disclosure. The illustrated near-eye optical element 610 also includes an optional lens layer 220, a combiner layer 240, and a display layer 250. In-field illuminator 634 is coupled with transparent layer 630 in a field of view (FOV) of a user when a user is utilizing near-eye optical element 610. In-field illuminator 634 is configured to emit coherent near-infrared light centered around a first wavelength (e.g. 850 nm or 940 nm).

The illustrated embodiment of FIG. 6A includes a beam splitting element 653 configured to redirect a first portion of the coherent near-infrared light emitted by in-field illuminator 634 to a first beam expanding element 655 and redirect a second portion of the coherent near-infrared light to illuminate the second beam expanding element 657. In this way, in-field illuminator 634 illuminates the first beam expanding element 655 and the second beam expanding element 657 with the coherent near-infrared light from a same light source. The first beam expanding element 655 is configured to direct a first expanding beam 681 of the coherent near-infrared light to an eyebox area of eye 203 and the second beam expanding element 657 is configured to direct a second expanding beam 682 of the coherent near-infrared light to the eyebox area. The first expanding beam 681 and the second expanding beam 682 overlap to generate a fringe interference pattern 683 incident on the contours of eye 203 and the eyebox area. In one example, in-field illuminator 634 includes a VCSEL emitting near-infrared light centered around 850 nm.

Figure 7A:
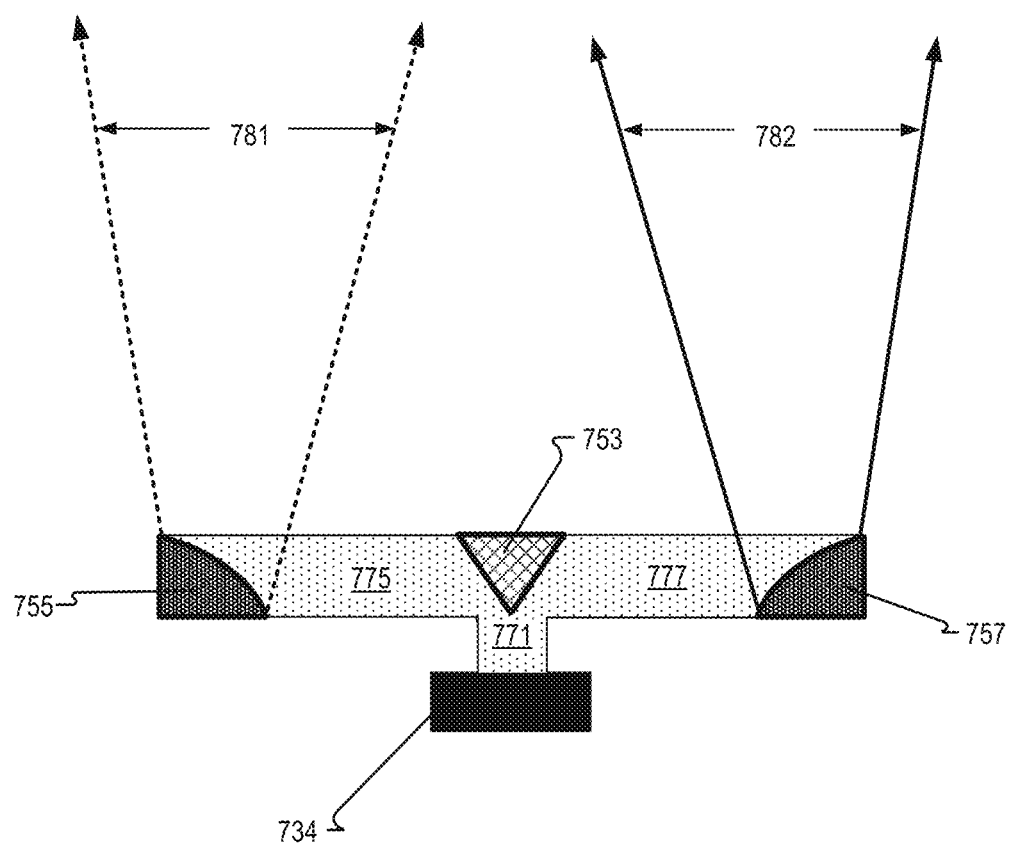
FIG. 7A illustrates a zoomed-in view of an optical arrangement including an example near-infrared in-field illuminator illuminating example beam expanding elements, in accordance with aspects of the disclosure.

To illustrate more details of FIG. 6A, FIG. 7A illustrates a zoomed-in view of an optical arrangement 798 including an example near-infrared in-field illuminator 734 illuminating example beam expanding elements 755 and 757, in accordance with aspects of the disclosure. Near-infrared in-field illuminator 734 may have the same properties as example near-infrared in-field illuminator 634. Near-infrared in-field illuminator 734 illuminates beam splitting element 753. Beam splitting element 753 is illustrated as a knife-edge beam splitting element having a mirrored surface. In-field illuminator 734 illuminates both sides of beam splitting element 753 with coherent near-infrared light 771 in FIG. 7A. Beam splitting element 753 is configured to redirect a first portion 775 of the coherent near-infrared light 771 emitted by in-field illuminator 734 to first beam expanding element 755 and redirect a second portion 777 of the coherent near-infrared light 771 to illuminate the second beam expanding element 757. The mirrored curvature of first beam expanding element 755 generates a first expanding beam 781 and the mirrored curvature of second expanding element 757 generates a second expanding beam 782.

Figure 7B:
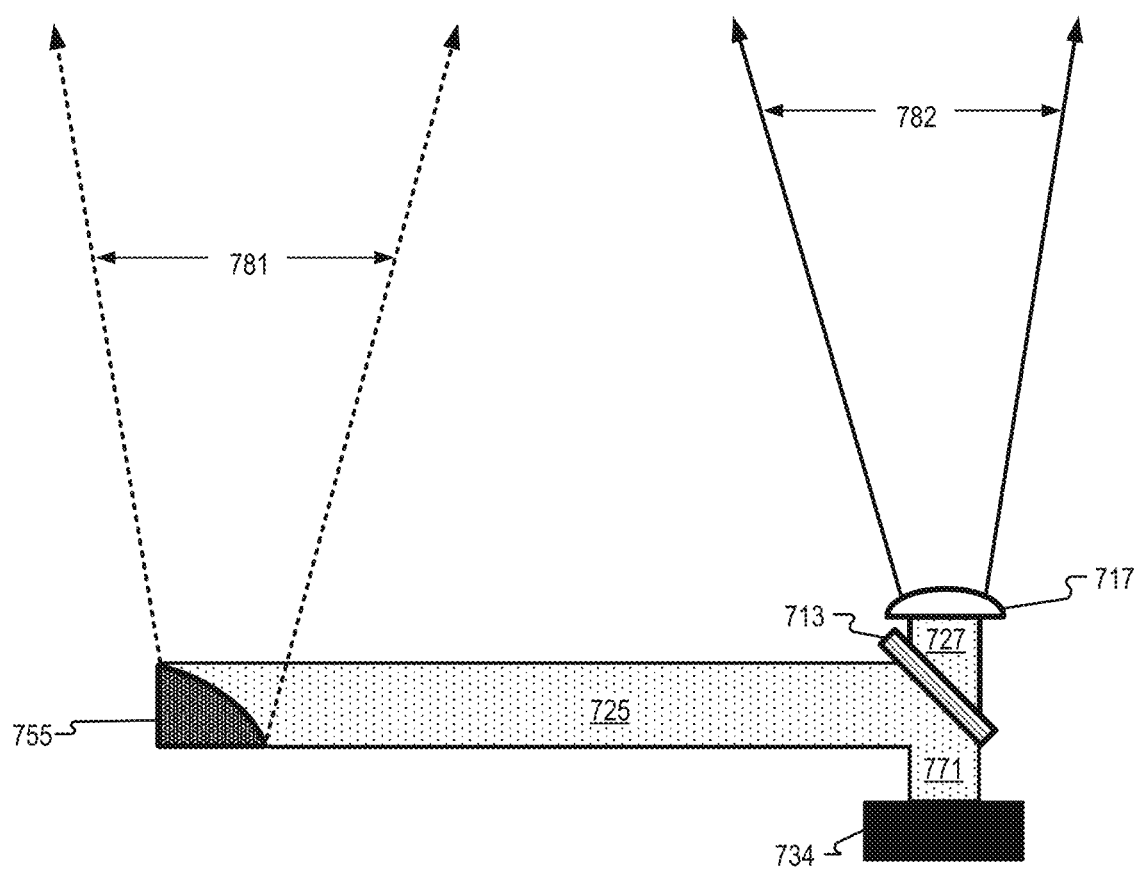
FIG. 7B illustrates a zoomed-in view of an optical arrangement including an example near-infrared in-field illuminator illuminating example beam expanding elements, in accordance with aspects of the disclosure

In other embodiments, one or more of the beam expanding elements may be refractive lenses rather than mirrored surfaces. In some embodiments, one or more of the beam expanding elements may be diffractive lenses rather than mirrored surfaces. FIG. 7B illustrates a zoomed-in view of an optical arrangement 799 including near-infrared in-field illuminator 734 illuminating example beam expanding elements 755 and 717, in accordance with aspects of the disclosure. In FIG. 7B, in-field illuminator 734 illuminates beam splitting element 713 that directs (reflects) a first portion 725 (e.g. 50%) of coherent near-infrared light 771 to a first beam expanding element 755 while passing a remaining portion 727 (e.g. 50%) of coherent near-infrared light 771 to a second beam expanding element 717. In this embodiment, the first beam expanding element 755 may include a mirrored surface to generate expanding beam 781 and the second beam expanding element 717 may be a refractive lens to generate expanding beam 782. In some embodiments, second beam expanding element 717 may be replaced by a diffractive optical element that generates a second expanding beam 782 when illuminated by the remaining portion 727 of coherent near-infrared light 771.

Figure 8:
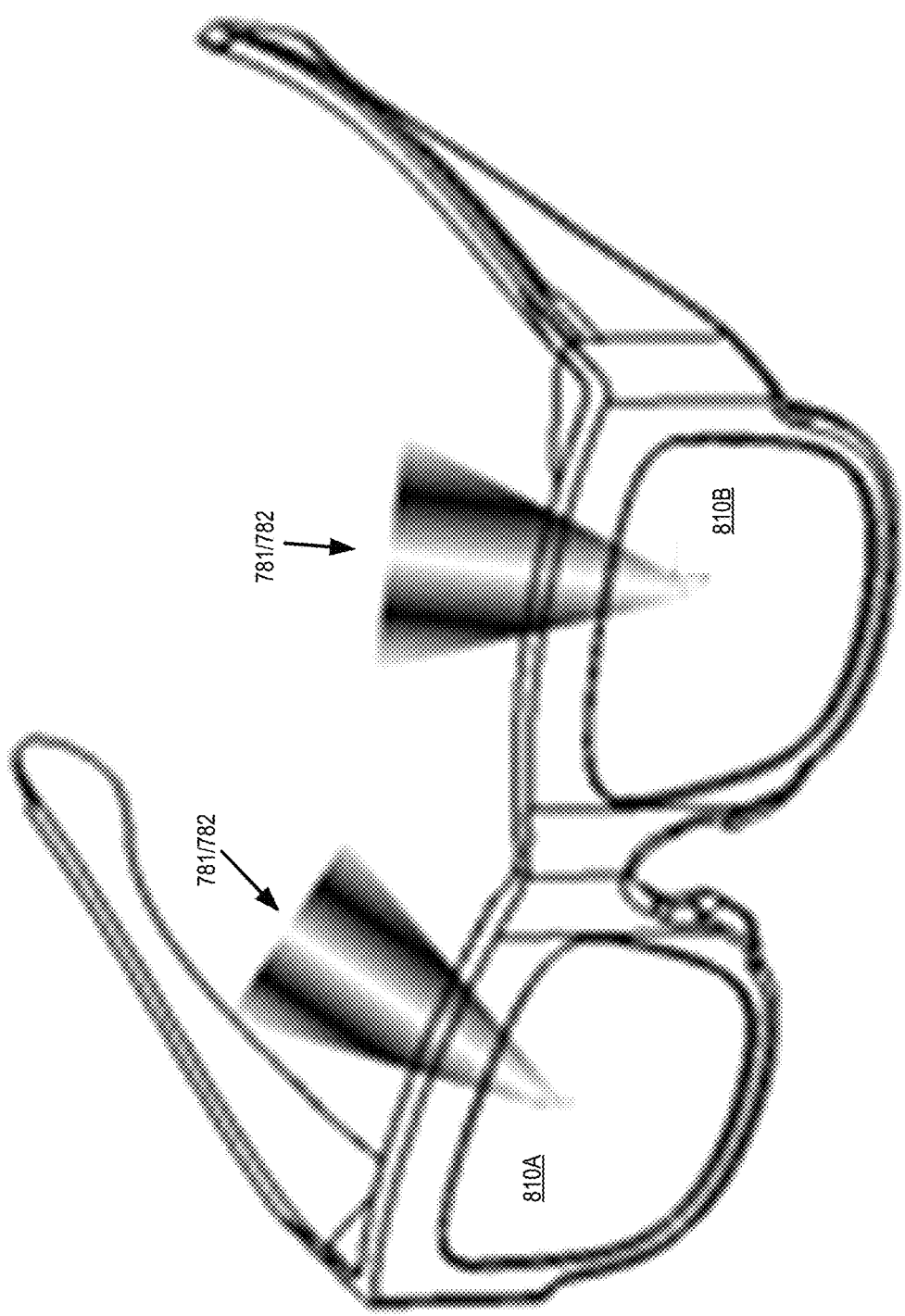
FIG. 8 illustrates that an HMD may include two near-eye optical devices that generate first and second expanding beams that overlap to generate a fringe interference pattern, in accordance with aspects of the disclosure.

FIG. 8 illustrates that an HMD 800 may include two near-eye optical devices that generate first and second expanding beams 781 and 782 that overlap to generate a fringe interference pattern. In some embodiments, each near-eye optical element 810A/B include a plurality of in-field illuminators and corresponding beam expanding elements to project multiple fringe interference patterns onto an eyebox area.

Figure 6B:
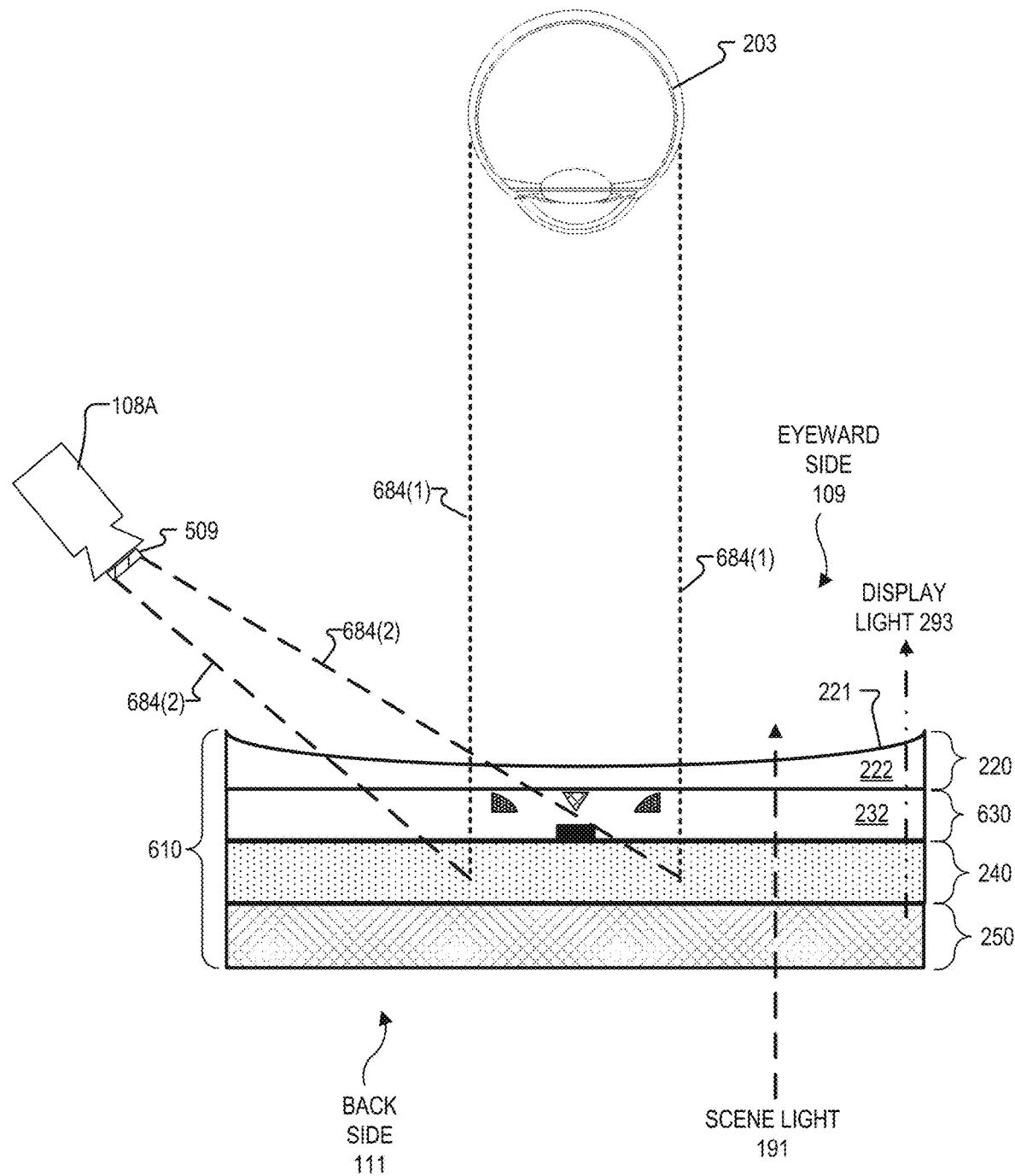
FIG. 6B illustrates reflections of a fringe interference pattern propagating along an optical path, in accordance with aspects of the disclosure.

Referring to FIG. 6B, the one or more fringe interference patterns incident on eye 203 are reflected by eye 203 (and/or surround eye lid, brow, or skin) along optical path 684(1). The reflection of the fringe interference pattern(s) propagates through layers 220 and 630 before encountering combiner layer 240. An optical combiner in combiner layer 240 redirects the reflection to camera 108A along optical path 684(2), in FIG. 6B.

One or more fringe interference patterns may be captured by camera 108A. Eye-depth value mappings may be generated based at least in part on fringe interference pattern image(s) captured by camera 108A. In some embodiments, a three-dimensional image of the eye is generated using a plurality of fringe interference pattern images.

The eye of the wearer of an HMD will distort the fringes of the fringe interference pattern(s) projected onto the eye and the fringe interference patterns will be distorted differently depending on the position of the eye. An eye-depth value or three-dimensional mapping of the eye may be used for eye-tracking purposes and a display image or display images directed to an eye of the user may be changed based on the eye-depth value or three-dimensional mapping. In one embodiment, a position of a software-generated blur filter is applied to display images in response to the eye-depth value(s) to provide focusing cues for a user of an HMD. In some embodiments, the depth data derived from capturing images of the fringe interference patterns may be used to determine eye gaze, capturing biometric features of a user of an HMD for recognition purposes, and/or to analyze eye-movements for different tasks.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A near-eye optical device comprising:
   a transparent layer to be placed within 25 mm of an eyebox of a user that wears the near-eye optical device, wherein the transparent layer is configured to be mounted to a frame of a head mounted device;
   a lens layer in a field of view (FOV) of the user and having a curvature for focusing light to an eyebox, wherein the lens layer is coupled to the transparent layer; and
   an in-field illuminator configured to emit near-infrared light centered around a first wavelength, wherein the in-field illuminator is encapsulated with a transparent material of the transparent layer in the FOV of the user; and
   a diffractive optical element (DOE) configured to be illuminated by the near-infrared light emitted by the in-field illuminator, wherein, when the DOE is illuminated by the near-infrared light centered around the first wavelength, the DOE generates a structured light projection that includes dots that expand as the structured light projection propagates farther from the DOE, the structured light projection directed by the DOE to illuminate the eyebox, and wherein the structured light projection propagates through the transparent material of the transparent layer.

2. The near-eye optical device of claim 1 further comprising:
   a camera configured to image the eyebox, wherein the camera is positioned to image the structured light projection on an eye.

3. The near-eye optical device of claim 2 further comprising:
   an optical combiner in the FOV of the user, wherein the optical combiner is configured to receive a reflection of the structured light projection that is reflected off the eye and redirect the reflection of the structured light projection to the camera, the optical combiner configured to be optically transparent to visible light and redirect the near-infrared light centered around the first wavelength to the camera.

4. The near-eye optical device of claim 3, wherein the optical combiner includes a hologram.

5. The near-eye optical device of claim 3, wherein the reflection of the structured light projection that is reflected off the eye propagates through the transparent layer prior to encountering the optical combiner.

6. The near-eye optical device of claim 2, wherein the camera includes a filter that passes the near-infrared light centered around the first wavelength and rejects other wavelength ranges.

7. The near-eye optical device of claim 1, wherein the near-infrared light is collimated, and wherein the in-field illuminator is configured to emit the collimated near-infrared light.

8. The near-eye optical device of claim 1, wherein the in-field illuminator includes at least one of an infrared vertical-cavity surface-emitting laser (VCSEL), laser diode, or superluminescent light emitting diode (SLED) with high spatial coherency.

9. The near-eye optical device of claim 1, wherein the dots are approximately circular in shape.

10. The near-eye optical device of claim 1, wherein the DOE is a transmissive DOE.

11. The near-eye optical device of claim 1, wherein the DOE is a reflective DOE.

12. The near-eye optical device of claim 1, wherein the DOE includes a hologram.

13. The near-eye optical device of claim 1, wherein the in-field illuminator has a footprint of less than 200 microns by 200 microns.

14. A device comprising:
   a frame;

temple arms for securing the device to a head of a user; and a near-eye optical element mounted to the frame, wherein the near-eye optical element is in a field of view of the user, the near-eye optical element including:
- a lens layer in a field of view (FOV) of a user for focusing light to an eyebox;
- a transparent layer including a transparent material;
- an in-field illuminator configured to emit near-infrared light; and
- a diffractive optical element (DOE) configured to be illuminated by the near-infrared light emitted by the in-field illuminator, wherein the DOE is configured to generate a structured light projection that expands as the structured light projection propagates farther from the DOE, the structured light projection propagating through the transparent material of the transparent layer and propagating through the lens layer to illuminate the eyebox.

15. The device of claim 14, wherein the near-eye optical element includes an optical combiner configured to receive a reflection of the structured light projection that is reflected off the eye and redirect the reflection of the structured light projection to a camera, the optical combiner configured to be optically transparent to visible light and redirect the near-infrared light centered around the first wavelength to the camera.

16. The device of claim 14, wherein the DOE is disposed between the in-field illuminator and the lens layer.

17. A head mounted display (HMD) comprising:
a frame; and
a near-eye optical element mounted to the frame, wherein the near-eye optical element is configured to pass scene light from a scene of an external environment to an eyebox, the near-eye optical element including:
- a transparent layer including a transparent material;
- an in-field illuminator configured to emit near-infrared light; and
- a diffractive optical element (DOE) configured to be illuminated by the near-infrared light emitted by the in-field illuminator, wherein the DOE is configured to generate a structured light projection that expands as the structured light projection propagates farther from the DOE, the transparent material of the transparent layer configured to pass the scene light and pass the structured light projection generated by the DOE to illuminate the eyebox.

* * * * *